United States Patent [19]

Brookhyser et al.

[11] 4,380,259

[45] Apr. 19, 1983

[54] VENEER LATHE APPARATUS AND METHOD USING INDEPENDENTLY ADJUSTABLE POWERED BACK-UP ROLL

[75] Inventors: Byron B. Brookhyser, Milton; Robert H. Lichtenwalter, Tacoma, both of Wash.; Arthur L. McGee, Lake Oswego, Oreg.; Darrell E. Pierson, Federal Way, Wash.

[73] Assignee: The Coe Manufacturing Company, Painesville, Ohio

[21] Appl. No.: 224,081

[22] Filed: Jan. 12, 1981

[51] Int. Cl.³ .............................................. B27L 5/02
[52] U.S. Cl. ................................... 144/357; 144/213; 364/478
[58] Field of Search ............... 144/209 R, 209 A, 210, 144/211, 212, 213; 364/478, 174

[56] References Cited

U.S. PATENT DOCUMENTS

| | | | |
|---|---|---|---|
| 2,766,786 | 10/1956 | Molyneux | 144/209 |
| 2,820,387 | 1/1958 | Smerz | 82/35 |
| 2,884,966 | 5/1959 | Zilm | 144/209 |
| 3,078,887 | 2/1963 | Heth | 144/209 |
| 3,372,721 | 3/1968 | James | 144/209 |
| 3,421,601 | 1/1969 | Springate | 144/209 |
| 3,455,354 | 7/1969 | Calvert | 144/209 |
| 3,515,186 | 6/1970 | Nagaoka | 144/209 |
| 3,600,900 | 8/1971 | Renoux | 82/38 |
| 4,073,326 | 2/1978 | Pank et al. | 144/209 |
| 4,197,888 | 4/1980 | McGee et al. | 144/209 |
| 4,221,247 | 8/1980 | Katsuji | 144/211 |
| 4,335,764 | 6/1982 | Schmidt | 144/209 R |

FOREIGN PATENT DOCUMENTS

| | | | |
|---|---|---|---|
| 605848 | 6/1960 | Canada . | |
| 757417 | 4/1967 | Canada | 144/213 |
| 2638376 | 3/1977 | Fed. Rep. of Germany . | |

OTHER PUBLICATIONS

"Tool Forces and Chip Formation in Orthogonal Cutting of Lublolly Pine", *USDA Forest Service Research Paper* 50-50, pp. 12-18, (1970).

"Lathe Check Formation in Douglas-Fir Products", *Forest Products Journal*, pp. 139-140, by E. H. Collins.
"Spin-Out of Veneer Blocks During Rotary Cutting of Veneer", *USDA Forest Service Research Paper FPL* 278, by Lutz & Patzer, (1976).
"The Buckling of Wood During Peeling", *Centre Technique Du Bois*, (Translation) pp. 19-41, J. Fordronmier, (1975).
"On the Rotary Cutting of Small Logs, Lathe Backup Rolls and Results of the Operations", *Journal of Japanese Wood Research Society*, vol. 4, pp. 227-231, T. Kanauchi, (1958).

*Primary Examiner*—W. D. Bray
*Attorney, Agent, or Firm*—Klarquist, Sparkman, Campbell, Leigh, Whinton & Dellett

[57] ABSTRACT

A veneer lathe log peeling apparatus and method of producing wood veneer are disclosed employing a powered back-up roll for adding torque to and preventing deflection of log cores of small diameter. The powered roll and an idler roll are positioned in contact with the side of the log in spaced relationship so that the resultant force vector of the cutting forces produced by the lathe knife and the nose bar is directed between the idler roll and the powered roll. The angular and radial positions of the idler roll and the power roll relative to each other and with respect to the axis of rotation of the log are independently adjusted by an automatic control means, in response to decreases in the diameter of the log being peeled. The automatic control means preferably includes separate servo means for adjusting the positions of the powered roll and the idler roll and the speed of the powered roll in response to output control signals of a microprocessor computer having input signals corresponding to the diameter of the log, the speed of rotation of the log and the veneer thickness. Preferably the idler roll is positioned on the opposite side of the log from the knife means and the powered roll is positioned above such knife means. Therefore, the additional torque applied to the log by the power roll automatically increases when the log core tends to deflect thereby self-compensating to prevent such deflection.

27 Claims, 8 Drawing Figures

VENEER LATHE APPARATUS AND METHOD USING INDEPENDENTLY ADJUSTABLE POWERED BACK-UP ROLL

BACKGROUND OF THE INVENTION

The subject matter of the present invention relates generally to veneer lathes for peeling thin sheets of wood veneer from a rotating log by cutting such log with a lathe knife. For maximum veneer production, it is desirable to peel the log until the remaining log core is of a small diameter on the order of 4 inches or less. However, this is difficult because log cores of small diameter tend to deflect relative to the veneer knife thereby producing a non-cylindrical core and veneer of non-uniform thickness or causing the core to break loose from the lathe spindles. Thus, as a result of such deflection the cutting forces applied to the log are greatly increased which can cause the log cores to break or spin loose from the lathe spindles engaging the log at the opposite ends thereof to supply the torque for rotation of such log.

In order to prevent such deflection of the log cores and to provide a more uniform veneer thickness when peeling down to extremely small diameters, the veneer lathe apparatus and method of the present invention employs a powered back-up roll and an idler roll in contact with the side of the log. The powered roll and the idler roll are supported at spaced positions relative to the lathe knife to continuously balance the resultant cutting force applied to the core by the knife and any nose bar associated therewith. In addition, since the angle of the cutting force and amount of such force varies as the diameter of the log decreases during peeling, the method and apparatus of the present invention automatically adjusts the angular and radial positions of the idler roll and the powered roll independently of each other and may also adjust the speed of the powered roll in response to control signal outputs of an automatic control means. The automatic control means may include a computer or a pair of cam operated potentiometers for adjusting the positions of the powered roll and idler roll by applying positioning reference signals to separate servo means for each roll.

PRIOR ART

It has previously been proposed to provide a pair of idler rolls in contact with the side of a log to support the log as it is rotated and peeled in a veneer lathe as shown in U.S. Pat. No. 3,078,887 of Heth issued Feb. 26, 1963. However, in this log supporting mechanism, the spacing between the idler roll is fixed and the angular and radial positions of the idler rolls on the log relative to the knife blade are not independently adjustable. In addition, no powered back-up roll is employed to supply added torque. Therefore, such log supporting mechanism did not overcome the abovediscussed deflection problem. In addition, by employing relatively short idler rolls less than half the length of the log and positioning them in the center of the log, a double bowing or compound deflection of the log results which causes further problems by producing a non-cylindrical core.

A veneer lathe apparatus having a pair of powered back-up rolls which apply additional torque to the log is shown in U.S. Pat. No. 2,884,966 of Zilm, issued May 5, 1959. However, the spacing between the two back-up rolls is fixed and the positions of such rolls cannot be independently adjusted with respect to the knife in order to compensate for variations in the angle of the cutting force and decreases in the cutting force torque as the diameter of the log decreases. Thus, unlike the present invention, the pair of back-up rolls of Zilm are not mounted on separate support arms, and such support arms are not independently adjusted to change the angular positions of the rolls on the log in response to decreases in diameter of the log and other factors. In addition, this support apparatus is also unsuitable because it employs short back-up rolls and positions them in approximate center of the log so that a compound bowing effect is achieved which causes further problems. Also, spiked surfaces are employed on the back-up rolls for positive drive which, of course, would damage the wood veneer and are therefore impractical. Finally, the angular spacing between the back-up rolls is too small because it is less than 45 degress, whereas the spacing between the rolls in the present invention is over 90 degrees. In view of this small angular spacing and the fact that such spacing is fixed, it appears that the force applied by the back-up rolls cannot balance the cutting force applied by the knife and the nose bar under all conditions.

It has also been proposed in U.S. Pat. No. 4,073,326 of Pank et al issued Feb. 14, 1978, to provide a pair of powered drive rolls which engage the sides of the log to provide the total torque for rotation of such log. Such veneer lathe does not have any lathe spindles engaging the ends of the log so there is no log core deflection problem. However, this has the disadvantage that the axis of rotation of the log is not fixed, but moves in a horizontal plane which causes many other problems including alignment of the log relative to the lathe knife. In addition, while the spacing between the two powered rolls is adjusted to accommodate different diameter logs, the relative angular and radial positions of such rolls on the log are not independently adjusted. These powered rolls urge the log against an idler roller whose vertical position with respect to the log is adjusted by a cam follower engaging a cam attached to the support arm of the lower power roll. This is done in order to clamp the log between the two power rolls and the idler roll in order to maintain the center of the log in a horizontal plane aligned with the lathe knife, because there are no lathe spindles engaging the opposite ends of the log for rotation thereof. Since there is no log core bowing problem, the movement of the rolls to adjust the spacing between such rolls is merely for clamping purposes not to overcome the bowing problem.

SUMMARY OF INVENTION

It is therefore one object of the present invention to provide an improved veneer lathe apparatus and method for peeling a rotating log in an accurate and efficient manner to produce a sheet of wood veneer of substantially a uniform thickness and which is capable of peeling the log down to an extremely small diameter core.

Another object of the invention is to provide such a method and apparatus which prevents deflection of the log core at small diameters and prevents spin-out or split-out of the core from engagement with the lathe spindles at the opposite ends thereof.

A further object of the invention is to provide such a method and apparatus employing at least one powered back-up roll and an idler roll which engage the side of the log at angularly spaced positions to balance the force applied to the log by the lathe knife and nose bar and to apply additional torque to the rotation of the log which is added to the torque of the lathe spindles.

An additional object of the present invention is to provide such a method and apparatus in which the positions of the power back-up roll and idler roll are independently adjusted relative to the rotational axis of the log, to the lathe knife and with respect to each other.

Still another object of the invention is to provide such a method and apparatus, including a control means for independently adjusting the angular and radial positions of the powered back-up and idler rolls and the speed of such powered back-up roll in response to decreases in the diameter of the log, changes in surface speed of the log, different veneer thicknesses and other factors.

A still further object of the invention is to provide such a method and apparatus in which the positioning of the powered back-up roll and idler roll are automatically controlled by a control means including a computer and servo means which adjust the positions of two separate support means for such rolls.

Other objects and advantages of the present invention will be apparent from the following detailed description of a preferred embodiment thereof and from the attached drawings.

DESCRIPTION OF PREFERRED EMBODIMENT

Figure 1:
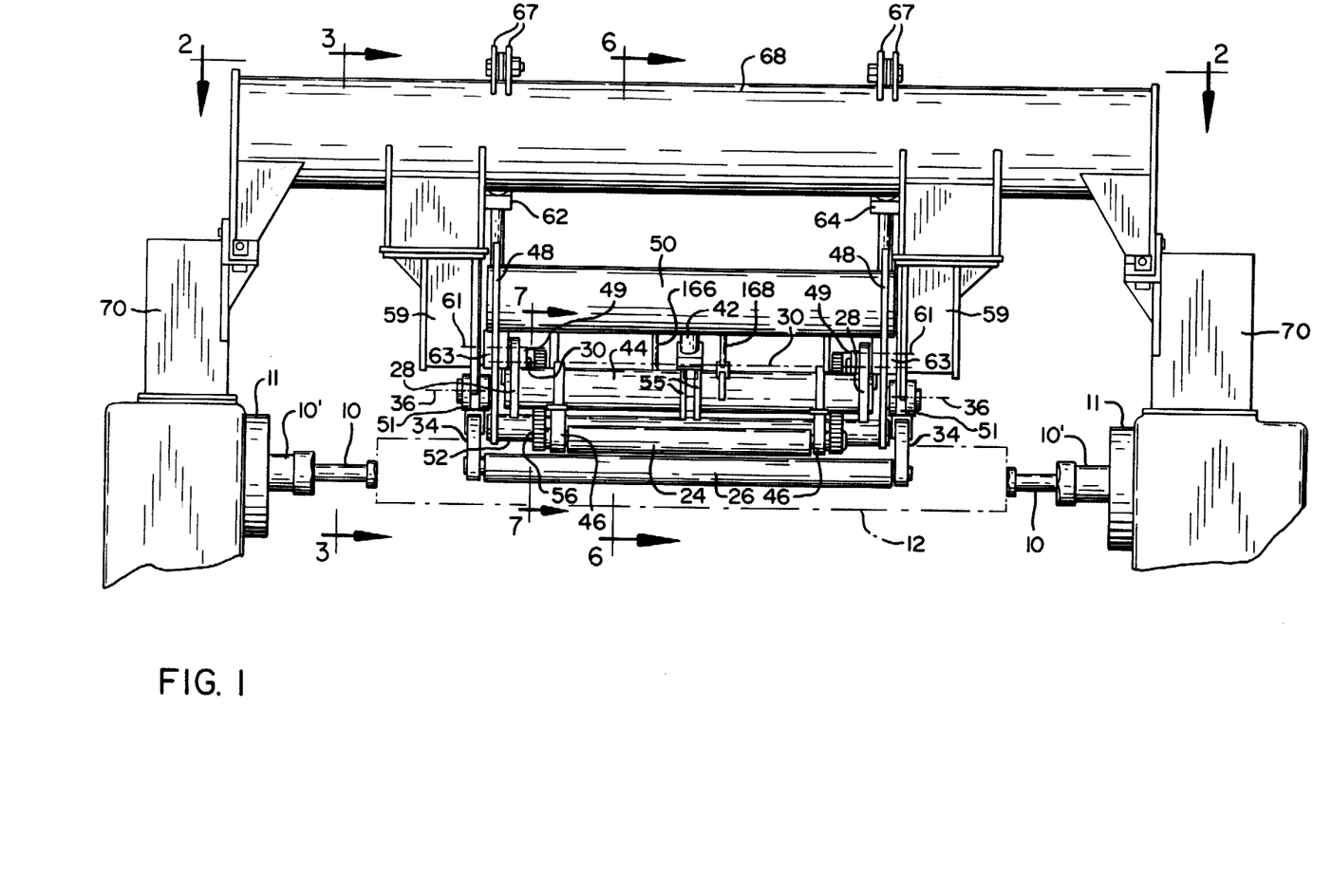
FIG. 1 is a front elevation view of a veneer lathe apparatus in accordance with the present invention.
Figure 2:
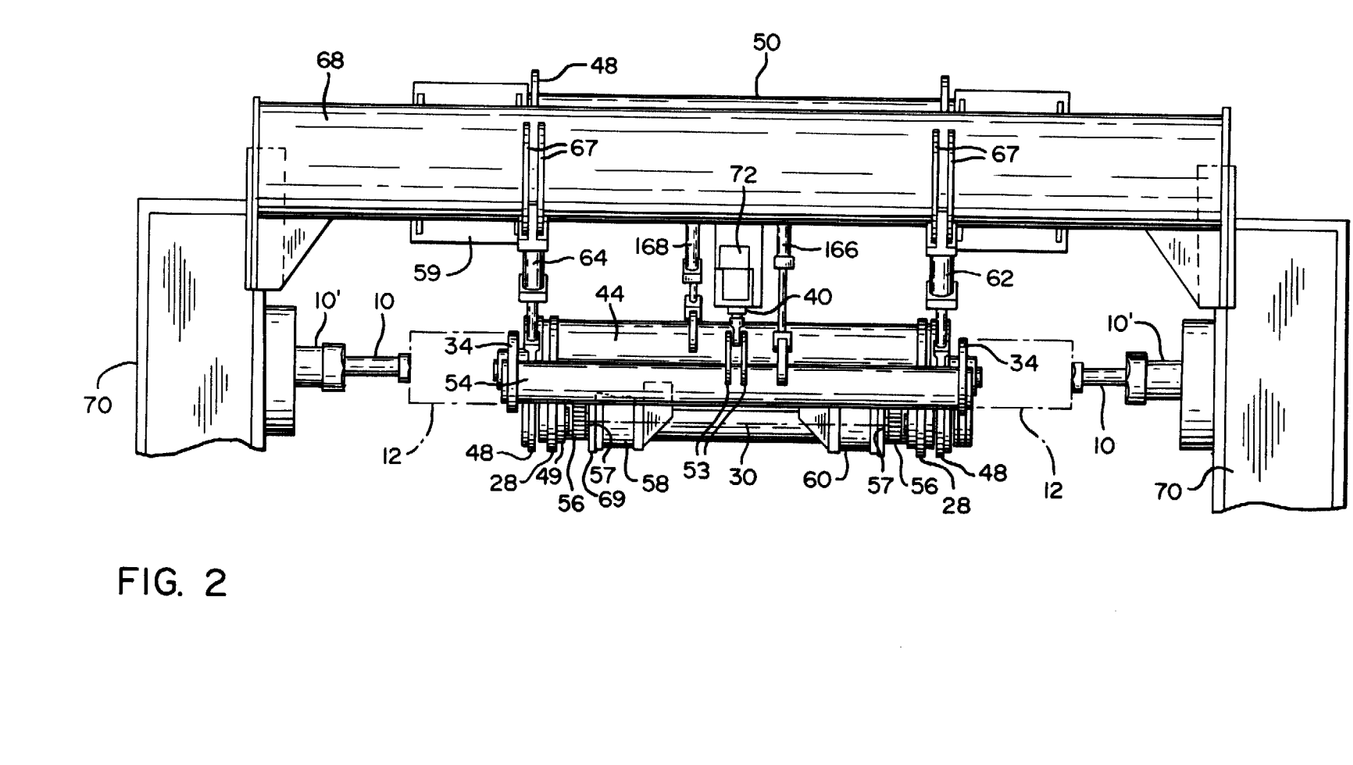
FIG. 2 is a top plan view taken along the line 2—2 of FIG. 1.
Figure 3:
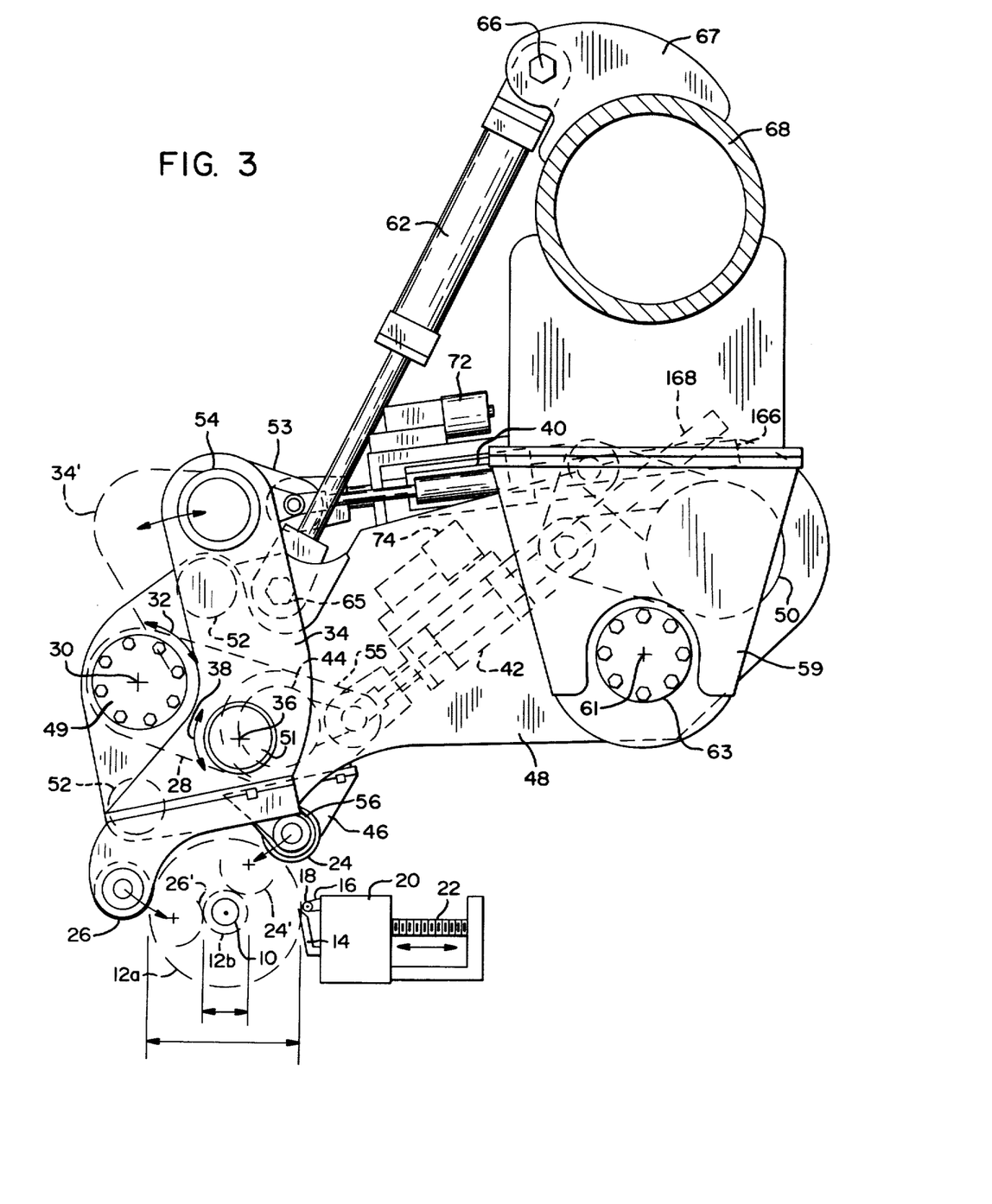
FIG. 3 is an enlarged vertical section view taken along the line 3—3 of FIG. 1.

As shown in FIGS. 1, 2 and 3 the veneer lathe apparatus of the present invention includes a pair of lathe spindles 10 rotated by a common electrical motor drive 11, for engaging the opposite ends of the log 12 to rotate such log while a lathe knife 14 engages the side of such log to peel a thin sheet of wood veneer from the log. A nose bar 16 which may be provided with a small diameter nose roller 18 is urged against the side of the log at a position closely adjacent the front of the blade of knife 14 to compress the wood so that it cuts better to provide a smoother surface veneer. It should be noted that the thickness of the veneer is controlled by adjusting the speed of advance of the knife into the log and by setting the spacing between the knife 14 and the nose bar 16, in a conventional manner. Thus, the lathe knife 14 and the nose bar 16 are mounted on a carriage 20 which is moved substantially horizontally toward the axis of the rotation of the log corresponding to the axis of the spindles 10 at a uniform rate such as by a feed screw drive 22 to peel the log from the maximum diameter 12a to the minimum diameter 12b shown in FIG. 3. The preceding operation of a veneer lathe is conventional and for this reason the details of such veneer lathe have not been shown in the drawings for purposes of clarity.

It should be noted that the lathe spindles 10 may actually be two or more sets of concentric spindles of different diameter with the larger spindles 10' used for rotation of the log when it is of large diameter such as, for example, 24 to 12 inches while the smaller spindles rotate the log when it is of smaller diameter of, for example, 12 inches to 3¼ inches. The smaller spindles are employed to enable the log to be peeled to a very small diameter core for more efficient production of veneer. However, the large spindles are to provide sufficient torque to rotate the log when it is of large diameter.

Figures 4, 5:
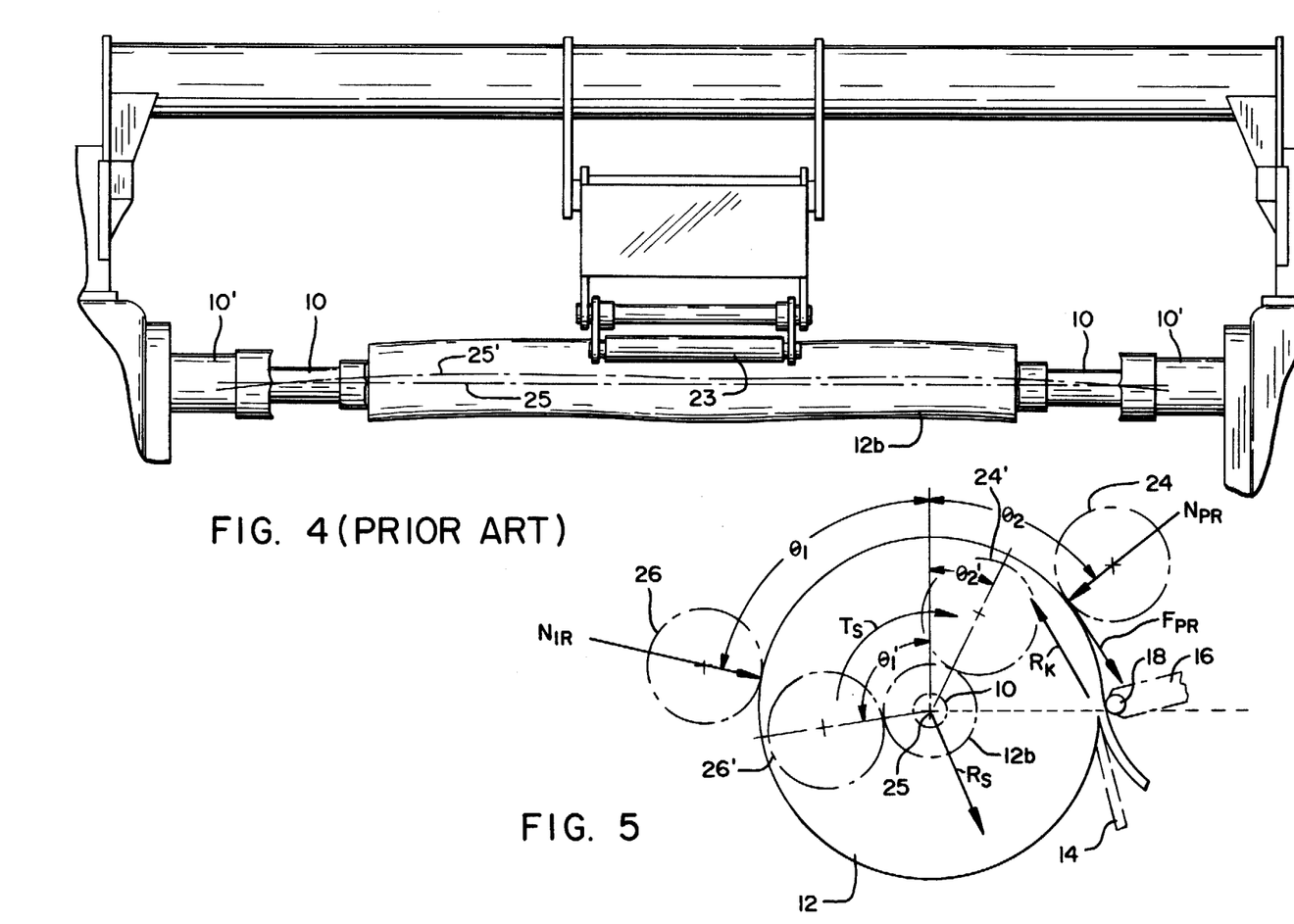
FIG. 4 is a front elevational view of a prior art veneer lathe apparatus showing the log core deflection problem.
FIG. 5 is a simplified force diagram of the forces produced in the apparatus of the present invention which solves the problem of FIG. 4.

As is shown in FIG. 4, the prior art veneer lathe apparatus using a pair of short idler rolls 23 and no powered back-up roll, such as disclosed in U.S. Pat. No. 3,078,887 of Heth, has a log core deflection problem for small diameter cores. Thus, when the log 12 has been peeled to a small diameter core 12b, it tends to deflect laterally to move the axis of rotation 25 upwardly into the double bow shape 25' shown. As a result, the veneer thickness is no longer uniform and the core tends to break or spin out from engagement with the spindles 10.

This problem is overcome by the apparatus and method of the present invention, including the use of a powered back-up roll 24 and an idler back-up roll 26 of greater length than rolls 23 which are supported at angularly spaced positions in contact with the side of the log, as shown in FIGS. 1 and 3. Preferably the idler roll 26 engages the log substantially 180 degrees from the point of contact of the lathe knife 14 and nose bar 16 so that it is on the opposite side of the log therefrom. Also the idler roll 26 extends in contact with the log over more than one-half of the major portion of the length of said log to prevent double bowing of the log core. The powered roll 24 is positioned in contact with the log at a position above the knife 14 and the nose bar 16 as well as above the lathe spindles 10 and idler roll 26. In addition, the powered roll 24 is angularly spaced from the idler roll 26 by an angle greater than 90 degrees which changes when the angular positions of such rolls are independently adjusted by an automatic control means in response to changes in the diameter of the log, the speed of rotation of the lathe spindles and the veneer thickness as well as other factors including the wood condition and type.

As shown in FIG. 5 the idler roll 26 and the powered back-up roll 24 in the veneer lathe apparatus of the present invention solve the log deflection problem of FIG. 4 by balancing the variable cutting reaction force, $R_k$, produced by the lathe knife 14 and the pressure bar means 16, 18 on the log. The combined cutting force, $R_k$, acts along a line extending from the knife blade 14 and between the idler roll 26 and the powered roll 24 at an angle to the vertical which changes with the diameter of the log core in the range of approximately 10° to 20°. The idler roll 26 produces a normal idler roll force, $N_i$, perpendicular to the log surface and acting on a line extending between the axis of the idler roll and the axis of rotation 25 of the log at an angle $\theta_1$ with respect to a vertical axis. The powered back-up roll 24 produces a normal power roll force, $N_p$, perpendicular to the log surface and acting on a line extending between the axis of the power roll and the axis of rotation of the log at an angle $\theta_2$ with respect to the vertical axis. The angular spacing, $\theta_1 + \theta_2$, between the idler roll and the power roll varies, but is kept greater than 90° for better balancing of forces. In addition, the powered roll 24 applies a friction force, $F_{pr}$, to the surface of the log at a point where the power roll contacts the log and such friction force acts on a line perpendicular to $N_{pr}$ and approximately parallel to $R_k$. $F_{pr}$ is equal to $\mu N_{pr}$ where $\mu$ is the coefficient of friction of the material of the power roll which is preferably polyurethane, when in contact with the log. The coefficient of friction varies between 0.2 and 0.6 for most logs. Also the torque or turning force, $T_s$, applied by the lathe spindles 10 to the log and the spindle reaction force, $R_s$, help to balance the combined cutting force, $R_k$.

It can be seen from FIG. 5 that the vertical component of the cutting force, $R_k$, which may change with reductions in log core diameter during peeling, is balanced primarily by the power roll forces $N_{pr}$ and $F_{pr}$ and the spindle reaction $R_s$. However, the horizontal components of the cutting force, $R_k$, and the power roll force, $N_{pr}$, are balanced primarily by the idler roll force $N_{Ir}$. It should be noted that the horizontal components of the power roll forces $N_{pr}$ and $F_{pr}$ are of opposite direction and tend to cancel each other. Thus, balance can be maintained by adjusting the angular spacing between the rolls 24 and 26 to change the angles of application $\theta_1$ and $\theta_2$ of the idler roll force, $N_{Ir}$, and the power roll force, $N_{pr}$, to new angles $\theta_1'$ and $\theta_2'$ when the core limit of 3 and $\frac{1}{2}$ inches diameter is reached, and by adjusting the speed of power roll to change the power roll friction force, $F_{pr}$, in the manner of the present invention. Typical values of these angles for a 12 inch diameter log are $\theta_1 = 78°$, $\theta_2 = 38°$ and for a 3 and $\frac{1}{2}$ inch diameter log are $\theta_1' = 95°$, $\theta_2' = 20°$. The speed of the lathe spindles is varied by the operator up to about 500 RPM and the surface speed of the power roll is set to be initially 5% greater than the surface speed of the log as driven only by such spindles.

Also, the present lathe back-up roll apparatus is self-compensating to balance the forces because when the cutting force, $R_k$, increases it tends to cause the log to raise upward, pivot about the knife edge toward the powered roll 24 and exert greater pressure against the powered back-up roll. This increases both of the power roll forces $N_{pr}$ and $F_{pr}$ which balances the increase in the cutting force, $R_k$. The resulting increase in the power roll force $N_{pr}$ on the block 12 increases the pressure on the idler roll force, $N_{Ir}$, which balances such increased power roll force. As a result, the idler roll minimizes thickness variations of the peeled veneer.

In a typical example where the coefficient of friction, $\mu$, is about 0.4 the powered roll 24 supplies about 30% of the torque required for peeling the log and the other 70% is supplied by the lathe spindles 10. The cutting force, $R_k$, varies in the range of between 25 and 75 pounds per inch of length of the log core. Thus, for a core length of 102 inches, the cutting force is between 2550 and 7650 pounds.

The powered roll 24 is mounted on a pair of support arm members 28 which are pivoted about a pivot axis 30, as shown by arrows 32. Similarly, the idler roll 26 is mounted on a pair of support arm members 34 which are pivoted about a pivot axis 36, as shown by arrows 38 in FIG. 3. Thus, the support members 28 and 34 are independently adjusted by cylinders 42 and 40 which are shown in FIGS. 1 to 3.

As shown in FIGS. 1 and 3, the powered roll 24 is attached to a roll support beam 44 by a pair of mounting members 46 containing bearings. The support beam is attached to a pair of support members 28 at the opposite ends thereof which are pivotally secured to assembly support plates 48 at the opposite ends thereof by bearings 49 to rotate about pivot axis 30. The assembly support plates 48 are fixedly fastened to an assembly support beam 50 at the right end of the support plates 48 and to a pair of auxiliary beams 52 at the left end of such support plates for added strength in order to maintain the spacing between such support plates, as shown in FIG. 3.

The idler roll 26 is mounted on one end of the pivoted support arms 34 which are attached to the assembly support plates 48 by bearings 51 to pivot about axle 36 while the upper ends of the support arms 34 are connected to a common support beam 54, as shown in FIGS. 2 and 3. The support beam 54 is connected by flanges 53 to the piston rod of cylinder 40 which rotates the support arms 34 about pivot 36 in the direction of arrows 38 to adjust the position of the idler roll 36 angularly about the axis of the spindles 10 and radially toward and away from such spindle axis.

In a similar manner, the power roll control cylinder 42 is connected by a piston rod to flanges 55 on the support beam 44 and rotates the support arms 28 about the pivot 30 to adjust the position of the powered roll 24 angularly about the axis of the spindle 10 and radially toward and away from such spindle axis. The powered roll 24 is driven by two coupling chains 56 at the opposite ends thereof connected to the drive shafts 57 of two hydraulic motors 58 and 60 whose axis coincides with the axis of the pivot 30, as shown in FIG. 2. Motors 58 and 60 are attached by mounting plates 69 to the auxiliary beams 52 for movement with support plates 48, as shown in FIG. 7, while their shafts 57 pivot with support members 28 about axis 30.

The entire back-up roll assembly, including the idler roll 26, the powered roll 24 and their individual support beams mounted on support plates 48, is pivoted about the axis 61 of assembly support bearings 63 fastening support plates 48 to the sub-frame 59. Thus, the assembly is raised and lowered by elevation cylinders 62 and 64 whose piston rods are pivotally attached to support plates 48 at pivots 65. The upper ends of the cylinders 62 and 64 are attached at pivot connections 66 to flanges 67 on a fixed main support beam 68 which is the primary support for the entire assembly. The sub-frame members 59 supporting the back-up roll assembly are hung from the main support beam 68. The opposite ends of the fixed support beam 68 are mounted on frame members 70.

Figures 6, 7:
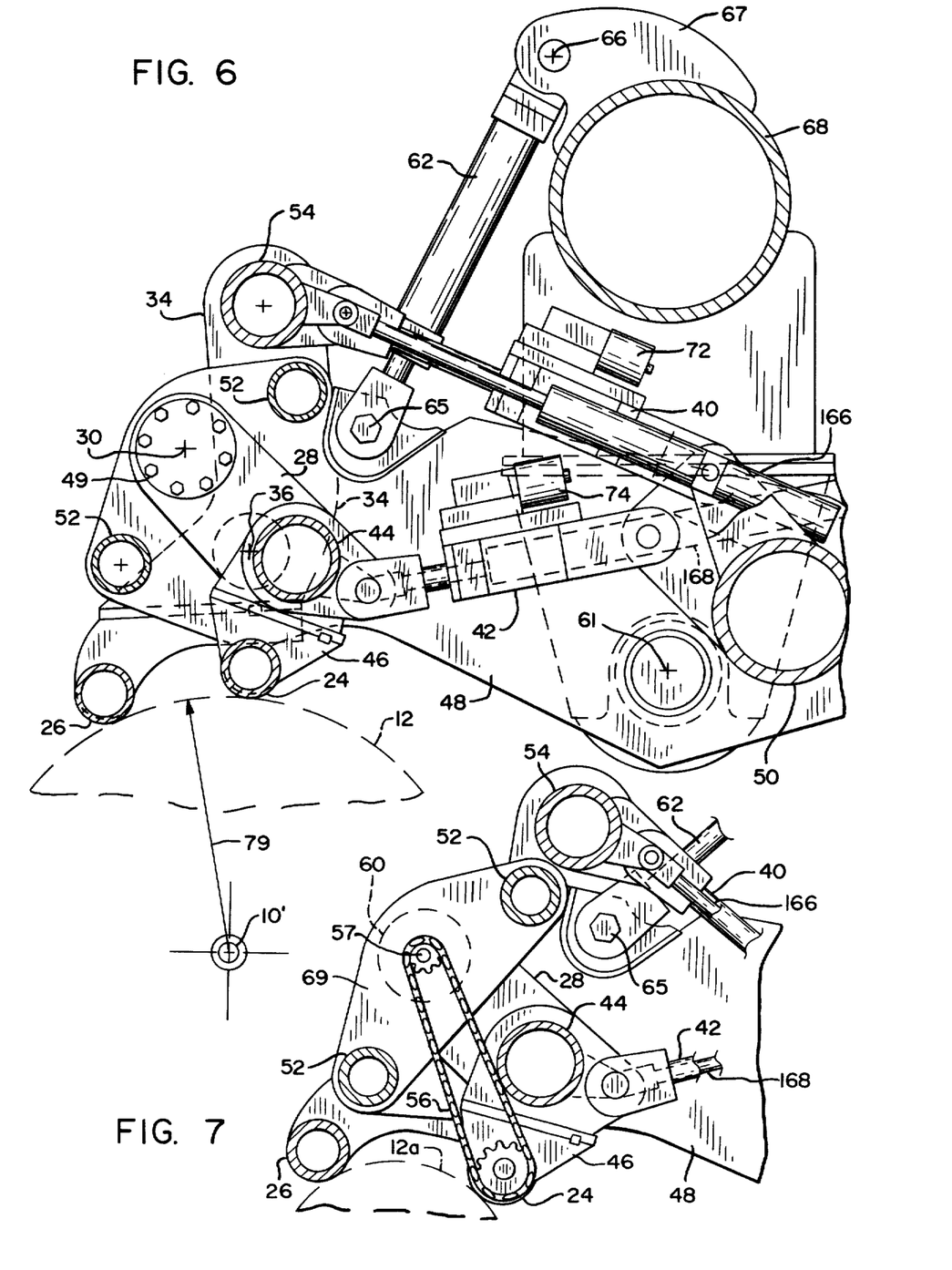
FIGS. 6 and 7 are vertical section views taken along the lines 6—6 and 7—7 of FIG. 1.

The back-up roll assembly is shown in an elevated position in FIG. 6 to provide clearance 79 to a 19 inch radius for a large diameter log to be loaded into the lathe spindles 10' by a lathe charger (not shown) such as that described in the U.S. Pat. No. 4,197,888 issued Apr. 15, 1980. The back-up roll assembly is shown in a lowered position in FIGS. 3 and 7, and the piston rod of cylinder 62 fully extended. In this lowered position the cylinders 40 and 42 pivot the idler roll 26 and the powered roll 24 into contact with the surface of the log at positions determined by operating associated servo valves 72 and 74 with an automatic control system shown in FIG. 8.

Figure 8:
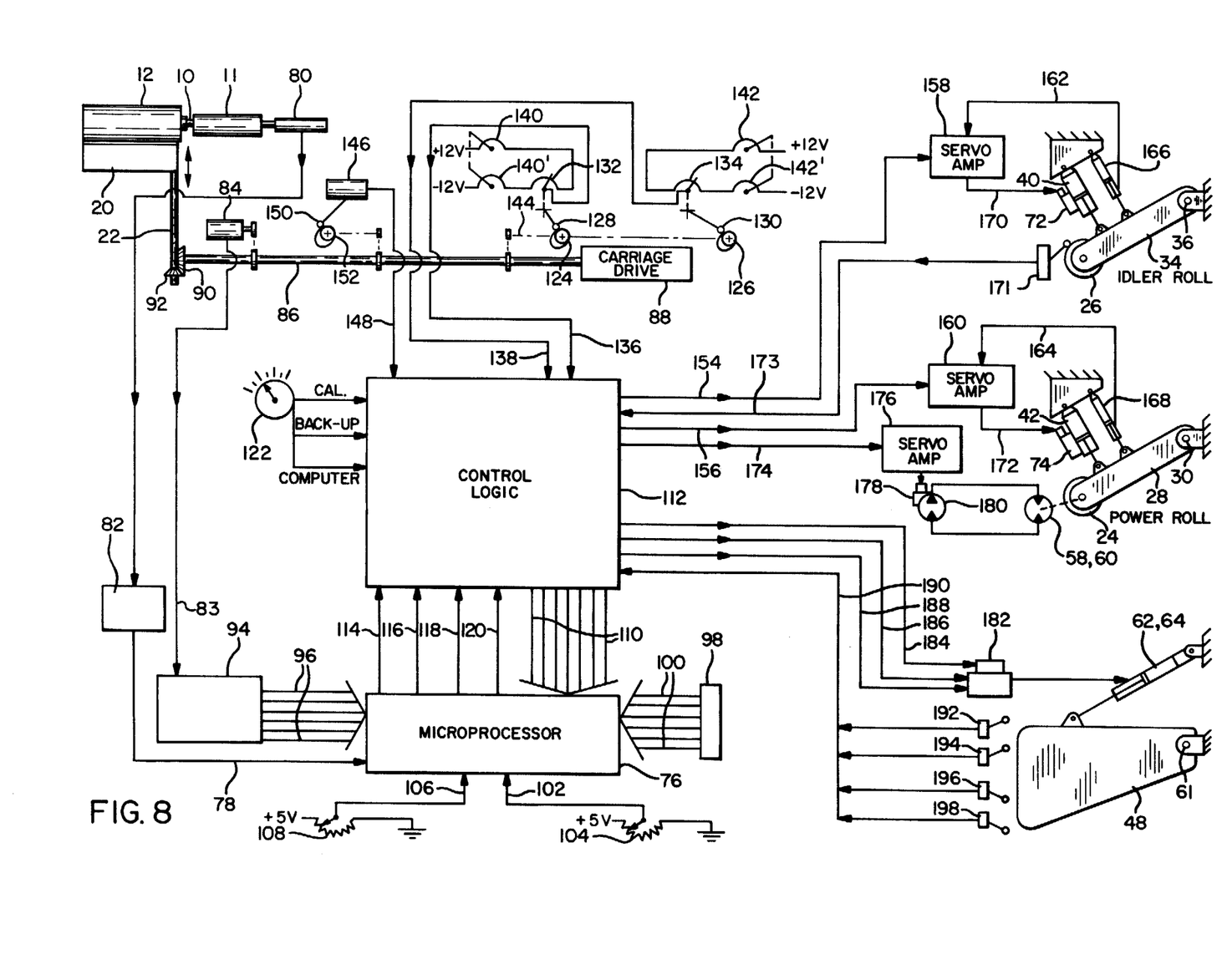
FIG. 8 is a diagram of the automatic control system in the apparatus of FIGS. 1 to 3.

An automatic control system for the veneer lathe back-up roll apparatus of the present invention is shown in FIG. 8. The system includes a digital computer microprocessor 76 having a lathe spindle speed input 78 from a tachometer 80 connected to the output of a spindle shaft drive motor 11 and producing an electrical signal corresponding to the rotational speed of the lathe spindles. The speed signal is amplified by an operational amplifier 82 and converted to a digital signal before application to the microprocessor. The microprocessor 76 is also provided with a knife carriage position input signal transmitted through line 83 from the output of a carriage position transducer 84. The transducer 84 is coupled to a carriage drive shaft 86 which moves the feed screw 22 for advancing the knife carriage 20 toward the center of the log 12 during peeling so that the rotational position of such transducer corresponds to the linear position of the carriage and the diameter of the log core 12. The carriage drive shaft 86 is connected to the output of a drive motor 88 and is coupled by a pair of bevel gears 90 and 92 to the feed screw 22 to rotate such screw. The carriage position signal on line 83 is transmitted through a carriage position encoder 94 which converts the analog signal to a binary coded decimal (BCD) signal that is transmitted through parallel input lines 96 to the microprocessor 76.

In order to indicate the veneer thickness, a thickness veneer switch 98 is provided for manual adjustment by the operator to produce a thickness input signal which is converted to a BCD signal and supplied to the microprocessor 76 over parallel input lines 100. The microprocessor 76 is also provided with an idler roll position advance/retard signal at input 102 by a manually adjustable potentiometer 104. The idler advance/retard signal adjusts the D.C. reference voltage applied to the microprocessor corresponding to the reference position of the idler roll and is adjustable to compensate for wear on the surface of such idler roll. Similarly, a power roll advance/retard signal input 106 is provided and connected to the output of another manually adjustable potentiometer 108. The power roll advance/retard signal sets the D.C. reference voltage for the reference position of the power roll and compensates for wear of such roll.

The only other inputs to the microprocessor 76 are the complete cycle control signal inputs 110 which are a plurality of parallel inputs supplied by a control logic circuit 112. In the automatic mode, the control signals at inputs 110 include a "full down" signal which indicates that the back-up roll assembly is in a fully down position, a "core limit" signal which indicates when the log 45 core has been peeled to a core limit of, for example, approximately 3 and ¼ inches in diameter, and a "go down" signal which signals when the powered back-up roll and the idler roll are moved down into contact with the log in the lowered position of the back-up roll assembly. The inputs 110 also includes a "full up" signal which indicates when the back-up roll assembly is elevated into its full up position, a "go out" signal which indicates when the idler roll and the powered back-up roll are opened up to release the log core, and a "hover" signal produced when problems have occurred in the computer or other parts of the system to cause the back-up roll assembly to hover in position until the problem is corrected.

The microprocessor 76 has stored within it a computer program which corresponds to a calibration position table containing the desired positions of the idler roll and power roll at different angular positions and radial positions with respect to the lathe spindle axis depending upon the diameter of the log. The calibration table is produced using a calibration standard in the lathe spindles 10, rather than a log. In addition, the microprocessor computer program also has a powered back-up roll speed adjustment table stored therein, such desired speed varying in accordance with the diameter of the log as indicated by the knife carriage position and with the lathe spindle speed inputs to such microprocessor. As a result, the microprocessor 76 produces four output signals, including a desired idler roll position signal at output 114, a desired powered back-up roll position signal at output 116 and a desired powered back-up roll speed signal at output 118 which are all applied to the control logic circuit 112.

The computer 76 receives a digital signal from the carriage position encoder 94 which changes linearly with carriage position. The computer then goes to its "look up" table for each roll. Knowing the carriage position, the computer goes to the corresponding location in the tables. This tells the computer what the digital output would be if there were a round cylinder in the lathe. Since the log is actually a spiral in shape, the computer adds an offset value, based upon the peel thickness, to the output value. Then the computer adds another offset value to the new output value based upon the setting of the advance/retard potentiometer 104 or 108 for each roll. This final digital output value is then sent to a Digital-to-Analog (D/A) converter, which converts the output value into an analog voltage at outputs 114 and 116 that is used to position the rolls.

At the same time the computer 76 is also receiving an analog signal from the lathe spindle drive tachometer 80, through the amplifier 82. This signal goes into an Analog-to-Digital (A/D) converter. The resulting digital speed signal and the carriage position data are used to calculate the surface speed of the log. The computer converts this information into an output signal that will drive the power roll at such a speed that the surface speed of the roll and the log are the same. This output signal is then multiplied by an overdrive percentage which will cause the power roll to drive faster than the block by that percentage. This modified output signal goes to a D/A converter which provides an analog speed control signal at output 118 which is then used to drive the servo-valve which strokes the variable displacement pump.

In addition, a "watch dog" timer signal output 120 is supplied by the microprocessor to the control logic circuit to determine when the system switches from a computer mode to a cam operated mode. The watch dog output 120 resets a time delayed relay in such control logic circuit that operates a switch to change to the cam operated back-up mode. If a watch dog timer output signal is not supplied by the microprocessor within a predetermined time interval to reset the time delay relay, such relay will automatically switch from a computer control mode to a cam controlled back-up mode. This would happen ordinarily if there is a malfunction in the computer.

A mode selection switch 122 is provided to operate the control logic circuit mode. In addition, the control logic circuit is automatically switched to the back-up mode operation when the time delayed relay in the logic circuit is not reset by the watch dog timer signal at microprocessor output 120. In the back-up mode two rotating cams 124 and 126 are used to control the positions of the idler roll 26 and the powered back-up roll 24, respectively. The surfaces of these cams are shaped to provide roll positioning information similar to that stored in the microprocessor for controlling the positions of the idler roll and the powered back-up roll. However, the motors 58 and 60 are valved into a neutral position so that no power is delivered to the powered roll 24 in the back-up mode. Cam followers 128 and 130 ride on cams 124 and 126 and operate the movable contacts of potentiometers 132 and 134 which supply position control signals to idler position input 136 and power roll input 138, respectively, of the control logic circuit. Thus, an idler roll position back-up signal is applied to input 136 by potentiometer 132 while a powered roll back-up signal is applied by potentiometer 134 to input 138 of such control logic circuit. The roll position signals on inputs 136 and 138 in the back-up mode correspond to the roll position signals on inputs 114 and 116 in the computer control mode. It should be noted that there is no powered back-up roll speed control input in the cam operated back-up mode, corresponding to the power roll speed input 118 of the computer mode. Thus, in the cam operated back-up mode, the veneer lathe back-up rolls are set for only one powered back-up roll speed and one veneer thickness so that it is not as versatile as the computer mode. However, two pairs of manually operated advance/retard roll position reference adjustment potentiometers 140 and 140′ and 142, 142′ are connected, respectively, in series with the idler roll position potentiometer 132 and the powered back-up roll position potentiometer 134 and function in a similar manner to the advance/retard potentiometers 104 and 108 connected to the microprocessor to adjust the reference position voltage to compensate for wear of the rolls. It should be noted that the back-up mode cams 124 and 126 are mounted on a cam shaft 144 which is coupled to the knife carriage drive shaft 86 so that the cams are rotated in accordance with the position of the knife carriage 20 which corresponds to the diameter of the log core as it is peeled.

A cam actuated switch 146 is also provided for indicating when the log core is less than 12 inches in diameter by supplying a control enabling signal at an input 148 to the control logic. Until the control logic circuit 112 receives such enabling signal on input 148, it will not cause the idler roll and powered back-up roll to be lowered into contact with the log. Thus, until the log core is peeled to a size below 12 inches in diameter, the idler roll and powered back-up roll are not moved into contact with the log because they are not needed on logs of large diameters. The cam switch 146 is operated by a cam follower 150 which rolls on the surface of a rotating cam 152 which is coupled to the knife carriage drive shaft 86. As a result, the rotational position of cam 152 corresponds to the radial position of the knife carriage 20 relative to the rotational axis of the log core 12, and therefore corresponds to the diameter of the log core.

Upon closure of switch 146 by sensing a 12 inch diameter log, the rolls 24 and 26 are spread apart and slowly lowered into contact with the log so that their impact is gentle and does not upset the peeling operation. Once the idler roll and powered back-up roll 26 and 24 are moved into contact with the log core as shown in FIG. 3 after actuation of the cam switch 146, the control logic circuit 112 produces an idler roll position reference signal at output 154 and a powered back-up roll position reference signal at output 156 which are analog signals applied to servo amplifiers 158 and 160, respectively. The servo amplifiers 158 and 160 compare the roll position reference input signals with actual roll position input signals on feedback inputs 162 and 164, respectively, supplied to two linear potentiometers coupled to the pistons of position transducer cylinders 166 and 168 and mounted in such cylinders for protection. Two transducer cylinders 166 and 168 are coupled to the support arms 34 and 28, respectively, of the idler roll and the powered feedback roll so that they indicate the positions of such rolls.

As shown in FIG. 2, the idler roll position transducer 166 is attached to the idler roll support beam 54 mounted on support arms 34 while the powered back-up roll position transducer 168 is attached to the power roll support beam 44 mounted on support arms 28 and the positions of such beams correspond to the positions of their corresponding rolls 26 and 24, respectively.

The servo amplifiers 158 and 160 produce difference signals at their outputs 170 and 172 which correspond to the difference in the voltage amplitudes of the roll position reference signals and the actual roll position signals on their two inputs. The difference signal output 170 of amplifier 158 is connected to the control valve 72 of the idler roll support cylinder 40, while the difference signal output 172 of amplifier 160 is connected to control valve 74 for the powered back-up roll support cylinder 42. The support cylinders 40 and 42 rotate the pivoted support members 34 and 28 until the idler roll 26 and the powered back-up roll 24 are in the positions corresponding to the reference signal outputs 154 and 156. When this occurs the feedback signals of the transducers 166 and 168 on inputs 162 and 164 are equal to the roll position reference signals at inputs 154 and 156 of the servo amplifiers 158 and 160 so that the difference signal outputs 170 and 172 of such amplifiers are both zero thereby preventing any further movement of the support cylinders 40 and 42. A limit switch 171 is positioned to be actuated when the idler roll support arm 34 is fully retracted in the up position of the back-up roll assembly and such switch supplies a load indicator signal to input 173 of the control logic circuit. Upon receipt of this load indicator input signal the control logic circuit causes a lathe charger (not shown) to load logs into the lathe spindles.

An analog speed reference signal is supplied from output 174 of the control logic circuit 112 to a servo amplifier 176 which controls the speed of motors 58 and 60 driving back-up roll 24. This is accomplished by applying the servo amplifier output signal to a servo control valve 178 which controls a variable displacement pump 180 that is pressure conpensated with a servo volume control. Thus, the amount of fluid flowing through the fluid motors 58 and 60 is controlled thereby adjusting the speed of the powered back-up roll to the speed reference signal produced by the microprocessor at output 118. It should be noted that the roll position reference signals at output 154 and 156 of the control logic may either correspond to the roll position outputs 114 and 116 of the microprocessor or the roll positioning outputs 136 and 138 of the cam actuated back-up mode system.

The main elevating cylinder 62 which raises and lowers the back-up assembly support members 48 is operated by a control valve 182 having three input signals supplied by the outputs of control logic circuit 112, including a fast operation output 184, an up output 186 and a down output 188. When the fast output 184 is operated the control valve 182 moves the cylinder 62 rapidly to pivot the assembly support 48 upward or downward depending on whether output 186 or output 188 is actuated. Four limit switches control this operation and are connected to a common input 190 for the control logic circuit, including a full-up switch 192, a slow-up switch 194, a slow-down switch 196 and a full-down switch 198. The limit switches are actuated by pivoting movement of the assembly support arms 48. Thus, the full-up switch 192 is closed when the support 48 is in a full-up position while the full-down switch 198 is closed when the support 48 is in a full-down position.

The slow-up switch 194 is closed at a predetermined height after the assembly support 48 has moved rapidly upward for a major portion of its travel and such switch turns off the fast input signal 184 to the control valve 182. This causes such control valve to operate the cylinder 62 to gradually raise the assembly support from the slow-up position to its full-up position. Similarly, the slow-down limit switch 196 is actuated by the assembly support 48 at a predetermined height while it is moving downward after it is traveled over a major portion of its path and such switch disconnects the fast input signal 184 to the control valve 182. As a result, the cylinder 62 then causes the assembly support 48 to be slowly lowered from the slow-down position to the full-down position. This enables the roll support assembly 48, 28, 24, 34 and 26 which is of a relatively large mass to be moved quickly and efficiently, but accurately to the full-up and full-down positions. This completes the operation of the automatic control system of FIG. 8.

It will be obvious to those having ordinary skill in the art that many changes may be made in the details of the above-described preferred embodiment of the present invention. Therefore, the scope of the present invention should only be determined by the following claims.

We claim:

1. Veneer lathe apparatus, comprising:
    lathe spindle means for engaging the opposite ends of a log to rotate said log;
    lathe knife means for peeling a thin sheet of veneer from said log as it rotates;
    first roll means for engaging the log;
    powered second roll means for engaging said log between said first roll means and said knife means to assist in the rotation of said log; and
    automatic control means for independently adjusting the positions of said first roll means and said powered roll means with respect to the axis of said lathe spindle means and for adjusting the spacing between the two roll means in response to reductions in the diameter of said log as it is peeled.

2. Apparatus in accordance with claim 1 in which the first roll means is an idler roll and the control means independently adjusts the angular positions of said first and second roll means about the lathe spindle axis.

3. Apparatus in accordance with claim 1 which also includes a nose bar means for engaging the log at a position spaced closely in front of the knife means.

4. Apparatus in accordance with claim 3 in which the powered roll is positioned so that the vector of the resultant force applied to the log by the knife means and nose bar is directed between the first and second roll means.

5. Apparatus in accordance with claim 2 in which the idler roll means engages the opposite side of the log from the knife means, and the powered roll means is positioned above the knife means, and the idler roll means.

6. Apparatus in accordance with claim 1 in which the idler roll means extends along a major portion of the length of the log.

7. Apparatus in accordance with claim 2 in which control means independently moves the powered roll means and idler roll means inward toward the axis of the spindle means as the knife means and nose bar are moved inward toward said axis during the peeling of the log.

8. Apparatus in accordance with claim 2 in which the powered roll means is spaced from said idler roll means by at least 90 degrees about the axis of the spindle means.

9. Apparatus in accordance with claim 2 in which the control means includes means for moving the idler roll means and powered roll means into engagement with the log after the log has been peeled to a predetermined diameter.

10. Apparatus in accordance with claim 2 in which control means includes a plurality of servo means which adjust the positions of the powered roll means and idler roll means in response to a detector means which senses changes in the diameter of said log.

11. Apparatus in accordance with claim 10 in which the detector means includes an electrical computer means which produces electrical control signals corresponding to the desired positions of said idler roll means and said powered roll means in response to input signals corresponding to the diameter of said log, the speed of rotation of the log, and the thickness of the veneer, and which applies said control signals to said servo means to adjust the positions of said idler roll means and said powered roll means.

12. Apparatus in accordance with claim 10 in which the detector means includes a cam means for controlling said servo means in response to changes in the diameter of the log.

13. Apparatus in accordance with claim 1 in which the control means also adjusts the speed of the powered roll means.

14. Apparatus in accordance with claim 2 in which the powered roll means is supported on a first pivoted support means which is pivoted by first cylinder means, the idler roll means is supported on a second pivoted support means which is pivoted by a second cylinder means, and the control means operates first and second servo controlled valve means for controlling said first and second cylinder means to adjust the angular positions of said idler roll means and said powered roll means.

15. Apparatus in accordance with claim 14 in which movement of each of the idler roll means and powered roll means is sensed by position transducer means which supplies a position signal to a feedback servo control means corresponding to the actual position of the roll means for comparison with desired position reference signals to produce dufference signals which are applied to the valve means.

16. Apparatus in accordance with claim 14 in which the first and second support means are mounted on a common support means which is operated by third cylinder means for raising and lowering both roll means to enable loading and unloading of logs into the lathe spindle means.

17. A method of producing wood veneer comprising the steps of:
    rotating a log with spindles engaging the opposite ends of said log;
    cutting the rotating log with a knife to peel a sheet of wood veneer from the log;
    engaging the side of the rotating log with at least two rolls angularly spaced apart and from said knife to support the log and prevent its deflection during cutting, at least one roll being a powered roll;

applying additional torque to said rotating log by said powered roll which rotates at a faster surface speed than the log is rotated by said spindles; and automatically adjusting the positions of said two rolls independently on the log during cutting in response to the decrease in diameter of the log to balance the cutting force applied to the log by said knife.

18. A method in accordance with claim 17 which also includes the step of adjusting the speed of rotation of the powered roll automatically during cutting in response to the decrease in diameter of the log.

19. A method in accordance with claim 17 which also includes the step of adjusting the angular positions of the rolls independently about the axis of the spindles.

20. A method in accordance with claim 17 which also includes the step of engaging the rotating log by a nose bar at a position closely spaced from the knife during cutting.

21. A method in accordance with claim 20 in which one of the rolls is an idler roll and includes the step of engaging the log with the idler roll and the power roll at spaced positions so that the vector of the resultant force applied to the log by the nose bar and the knife is directed between the idler roll and the powered roll.

22. A method in accordance with claim 21 which includes the step of engaging the log with the idler roll on the opposite side of the log from the knife, and positioning the powered roll above the knife, nose bar and idler roll.

23. A method in accordance with claim 21 which includes the step of moving the powered roll and idler roll automatically inward toward the axis of the spindles as the knife and nose bar are moved inward toward said axis during peeling of the log.

24. A method in accordance with claim 21 which includes the step of moving the idler roll and the powered roll automatically into engagement with the log after the log has been peeled to a predetermined diameter.

25. A method in accordance with claim 21 which includes the step of moving after peeling of a log is complete, the idler roll and powered roll out of the path of the next log as it is moved into position to be engaged by the spindles.

26. A method in accordance with claim 21 which includes the step of engaging the log at engagement positions of the idler roll and the powered roll which are angularly spaced by at least 90 degrees from each other about the axis of rotation of the log.

27. A method in accordance with claim 21 which includes the step of supporting the idler roll and the powered roll so that they both extend along a major portion of the length of said log.

* * * * *